United States Patent [19]

Kuze

[11] Patent Number: 4,546,049

[45] Date of Patent: Oct. 8, 1985

[54] ORNAMENTAL COMPOSITE OF A METAL ALLOY SURROUNDING A MINERAL POWDER CORE FOR USE IN SPECTACLE FRAMES

[75] Inventor: Takashi Kuze, Yokohama, Japan

[73] Assignee: Tokyo Shibaura Denki Kabushiki Kaisha, Kawasaki, Japan

[21] Appl. No.: 561,515

[22] Filed: Dec. 14, 1983

[30] Foreign Application Priority Data

Dec. 17, 1982 [JP] Japan .................................. 57-220215

[51] Int. Cl.$^4$ ........................ B32B 15/02; B32B 15/14; B32B 15/16
[52] U.S. Cl. .................................... 428/621; 428/614; 428/627; 428/632; 428/671; 428/672; 428/673; 428/674; 428/680; 428/545; 351/41
[58] Field of Search ............... 428/621, 627, 632, 614, 428/671, 545, 672, 673, 674, 680; 351/41

[56] References Cited

U.S. PATENT DOCUMENTS

| | | | |
|---|---|---|---|
| 3,352,650 | 11/1967 | Goldstein | 428/614 |
| 3,447,913 | 6/1969 | Yntema | 428/614 |
| 3,455,662 | 7/1969 | Alexander | 428/614 |
| 3,529,655 | 9/1970 | Lawrence | 428/614 |
| 3,535,093 | 10/1970 | Sara | 428/614 |
| 3,691,623 | 9/1972 | Staudhammer et al. | 428/614 |
| 3,938,964 | 2/1976 | Schmidt | 428/614 |
| 4,427,746 | 1/1984 | Takamura | 428/614 |

Primary Examiner—Veronica O'Keefe
Attorney, Agent, or Firm—Cushman, Darby & Cushman

[57] ABSTRACT

An ornamental composite material has a covering of an Ni-, Au-, Ag- or Cu-base alloy, and a core of a mineral powder aggregate. A layer of a metal different from the metals of the alloy of the covering can be clad on the inner surface of the covering as needed. The ornamental composite material is preferably used for various parts of a spectacle frame.

12 Claims, No Drawings

ORNAMENTAL COMPOSITE OF A METAL ALLOY SURROUNDING A MINERAL POWDER CORE FOR USE IN SPECTACLE FRAMES

BACKGROUND OF THE INVENTION

The present invention relates to an ornamental composite material and, more particularly, to a composite material for use in parts of spectacle frames.

Nickel-chromium alloys with excellent corrosion resistance, gloss, and workability have been developed in addition to German silver or the like as metallic materials for spectacle frames or the like. A spectacle frame having parts made of such a nickel-chromium alloy meets the requirements of mechanical strength, design, and workability.

However, a part made of such a nickel-chromium alloy has a problem of being heavy in weight, and does not therefore allow the spectacle frame to be made lighter in weight. For this reason, a Ti or Al material has been recently used to provide a lighter frame. Although both Ti and Al can provide lightweight frames, they both have problems. Ti has poor workability especially in fine processing or soldering. Al has a melting point as low as 600° C., is difficult to solder, and is too soft and allows easy formation of scratches.

In addition, neither Ti nor Al allows coloration for ornamental effects.

SUMMARY OF THE INVENTION

It is an object of the present invention to provide an ornamental composite material which has excellent workability, mechanical strength, corrosion resistance, and ornamental effects, and which is also light in weight.

According to the present invention, there is provided an ornamental composite material comprising a covering made of an Ni-base alloy, an Au-base alloy, an Ag-base alloy, or a Cu-base alloy; and a core made of an aggregate of a mineral powder.

A metal layer of a metal different from the metals of the alloy of the covering may be clad to, or plated on, the inner surface of the covering. A reinforcing material such as a metal wire or a metal fiber may be embedded in the aggregate.

The ornamental composite material of the present invention is preferably used for parts of a spectacle frame such as a rim or temple.

DETAILED DESCRIPTION OF THE PREFERRED EMBODIMENT

A mineral powder aggregate of a core of an ornamental composite material of the present invention includes a metal such as Ti, Si; an oxide such as MgO, $Al_2O_3$ or $ZrO_2$; a nitride such as $Si_3N_4$, AlN; a carbide such as SiC, TiC. MgO or $Al_2O_3$ is particularly preferable among these materials due to its light weight. A Ni-base alloy of a covering has corrosion resistance and plating ability etc. A particularly preferable Ni-base alloy is a nickel-chromium alloy which has 3 to 30% by weight of Cr. A particularly preferable Cu-base alloy of the covering is German silver which comprises 52 to 80% by weight of Cu, 5 to 35% by weight of Ni, and 10 to 35% by weight of Zn, and exhibits a color tone of white metallic gloss.

A Cu-base alloy containing 3 to 5% by weight of Al, so called Gold Bronze, and Monel Metal may be used as another Cu-based alloy of the covering.

An Au-base alloy of the covering includes a Ni-Au alloy and a Cu-Au alloy and exhibits a gold color tone. An Ag-base alloy of the covering a Cu-Ag alloy and Ni-Ag alloy and exhibits a silver color tone. The metal layer to be clad on the inner surface of the covering includes stainless steel, a Ni-base alloy such as Inconel and a Ti-base alloy. Said metal layer to be clad has excellent mechanical strength and elasticity. According to a modification of the present invention, the covering may be composed of a composite layer of a stainless steel layer and one of the Ni-, Cu-, Au-, or Ag-base alloy layer respectively plated on the surface of the stainless steel layer.

Pure gold may be plated on the surface of the covering.

In a section of the ornamental composite material of the present invention, the ratio of the sectional area of the core to the combined sectional area of the core and covering preferably falls within a range of 5 to 95% to provide a lighter material. However, the ratio of the sectional area of the covering to the combined sectional area of the core and covering preferably falls within a range of 5 to 95% so as not to impair the ornamental effects. The sectional area ratios of the core and covering may be selected in accordance with an application of the material. For example, when the ornamental composite material is to be used for a temple of a spectacle frame, the ratio of the area of the core is kept small while that of the covering is kept large in view of the properties of the nickel-chromium alloy of the covering. However, if the ornamental composite material is to be used for a rim, the ratio of the area of the core is kept large and that of the covering is kept small to provide a lighter material.

In order to prepare an ornamental composite material of the present invention, a hollow body or a sheath of an Ni-Cr alloy is provided for a covering. After filling a powder of MgO or the like together with a reinforcing material, if required, inside the hollow body, the hollow body is compressed by swaging in a cold or warm temperature range and is then drawn by a die. If required, annealing is performed between swaging and drawing.

The composite material prepared in this manner is formed into a part having a predetermined shape after forging, rolling, drawing, cutting, pressing or the like, depending upon the application of the part of an ornamental item such as a spectacle frame or a necklace. If a molded part such as a temple or a rim of a spectacle frame is to be formed, the composite material is subjected to forging, rolling, drawing or the like to be formed in a predetermined shape, and is then assembled by soldering and screwing.

The ornamental composite material of the present invention has excellent mechanical strength, workability and ornamental effects, and is light in weight, so that it is ideal for parts of a spectacle frame. The parts of a spectacle frame for which the ornamental composite material of the present invention may be used are a temple, a rim, a side, a rim lock, a side joint, a bridge, an ornament, a screw or the like.

EXAMPLE 1

A pipe of 3 mm outer diameter and 2 mm inner diameter and made of an Ni-Cr alloy was prepared. The Ni-Cr alloy contained 3 to 30% by weight of Cr for high corrosion resistance and good workability, 0.1 to 2.0% by weight of Ag for good cuttability, and 0.1 to 2.0% by weight of Cu for good solderability and corrosion resistance. An MgO powder was filled in the hollow interior of the pipe. The pipe was subjected to swaging to provide a composite material having an outer diameter of 1.5 mm. The composite material was rolled to form a rim of a spectacle frame. The resultant rim had a high mechanical strength and a weight which was about ½ of that of a rim which consisted of only a conventional Ni-Cr alloy. Since the core of the obtained composite material was a powder aggregate, it was easy to bend. The composite material could be easily bonded with another part by soldering or welding. A portion of a section of the composite material at which the MgO powder is exposed may be covered with a resin or may be covered by soldering or welding.

EXAMPLE 2

A composite material was prepared following the same procedures as in Example 1 except that a layer of a Cu-base alloy containing 1 to 3% by weight of Be was clad on the inner surface of the pipe of Example 1. A rim formed of the resultant material was light in weight and had a good mechanical strength.

EXAMPLE 3

A composite material was prepared following the same procedures as in Example 1 except that the pipe consisted of German silver and a 2% Be-Cu alloy metal wire having a diameter of 0.8 mm was inserted as a reinforcing material into the pipe at the same time the MgO powder was filled in the pipe. A spectacle rim consisting of this material had a good mechnical strength and was lighter than a rim consisting of only German silver.

When SUS310 and Inconel 600 and 718 were used as the materials of the metal wire, similar good results were obtained.

EXAMPLE 4

A composite material was prepared following the same procedures as in Example 3 except that a plating layer of an Au-base alloy of 20 K was arranged around a German silver pipe as in Example 3. A spectacle rim was prepared from the resultant composite material. The rim exhibited a gold color tone, was light in weight, and had a good mechanical strength.

What is claimed is:

1. An ornamental composite material comprising a covering made of material selected from the group consisting of a nickel-base alloy, a gold-base alloy, a silver-based alloy and a copper-base alloy; and a core consisting of an aggregate of a mineral powder.

2. A material according to claim 1, wherein a layer of a metal different from metals of the alloy of said covering is clad on an inner surface of said covering.

3. A material according to claim 1, wherein a reinforcing material is embedded in said aggregate.

4. A material according to claim 2, wherein a reinforcing material is embedded in said aggregate.

5. A material according to claim 1, wherein a mineral of the mineral powder is a member selected from the group consisting of a metal, an oxide, a nitride, and a carbide.

6. A material according to claim 3, wherein the reinforcing material is a member selected from the group consisting of a metal wire and a metal fiber.

7. A material according to claim 4, wherein the reinforcing material is a member selected from the group consisting of a metal wire and a metal fiber.

8. A material according to claim 1, wherein the ornamental composite material forms a part of a spectacle frame.

9. A material according to claim 1, wherein the covering comprises 5 to 95% of a combined sectional area of the covering and the core in a section of the ornamental composite material.

10. A material according to claim 1, wherein the core comprises 5 to 95% of a combined sectional area of the covering and the core in a section of the ornamental composite material.

11. A material according to claim 1, wherein the covering and the core are formed integrally by plastic deformation.

12. A material according to claim 1, wherein a mineral of the mineral powder is a member selected from the group consisting of an oxide, a nitride, and a carbide.

* * * * *